United States Patent
Amit et al.

(10) Patent No.: US 10,607,250 B2
(45) Date of Patent: Mar. 31, 2020

(54) ADVERTISEMENT SELECTION AND PRICING USING DISCOUNTS BASED ON PLACEMENT

(75) Inventors: Alon Amit, Los Altos, CA (US); Yaron Greif, San Francisco, CA (US); John Hegeman, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 735 days.

(21) Appl. No.: 13/488,294

(22) Filed: Jun. 4, 2012

(65) Prior Publication Data

US 2013/0325585 A1  Dec. 5, 2013

(51) Int. Cl.
*G06Q 30/02* (2012.01)
(52) U.S. Cl.
CPC ................ *G06Q 30/0241* (2013.01)
(58) Field of Classification Search
CPC .................................... G06Q 30/0274
USPC ....................................... 705/14.71
See application file for complete search history.

(56) References Cited

U.S. PATENT DOCUMENTS

| | | | |
|---|---|---|---|
| 2003/0149938 A1 | 8/2003 | McElfresh et al. | |
| 2005/0251444 A1 | 11/2005 | Varian et al. | |
| 2006/0149622 A1 | 7/2006 | Baluja et al. | |
| 2006/0150092 A1* | 7/2006 | Atkins | G06Q 10/043 715/251 |
| 2006/0224445 A1 | 10/2006 | Axe et al. | |
| 2007/0038643 A1 | 2/2007 | Epstein | |
| 2007/0288843 A1 | 12/2007 | Makino | |
| 2008/0004962 A1* | 1/2008 | Muthukrishnan | G06Q 30/0275 705/14.71 |
| 2008/0004990 A1* | 1/2008 | Flake | G06Q 30/02 705/26.1 |
| 2008/0262913 A1 | 10/2008 | Reitz et al. | |
| 2008/0270164 A1* | 10/2008 | Kidder | G06Q 30/02 705/14.4 |
| 2009/0326966 A1 | 12/2009 | Callaghan et al. | |
| 2010/0107061 A1 | 4/2010 | Ramakrishnan et al. | |
| 2010/0153831 A1* | 6/2010 | Beaton | G06Q 30/02 715/201 |

(Continued)

FOREIGN PATENT DOCUMENTS

| | | | |
|---|---|---|---|
| CN | 1356000 A | 6/2002 | |
| CN | 1947343 A | 4/2007 | |

(Continued)

OTHER PUBLICATIONS

Microsoft Computer Dictionary, Fifth Edition, 2002, Microsoft Press, p. 23.*

(Continued)

*Primary Examiner* — William A Brandenburg
*Assistant Examiner* — Michael I Ezewoko
(74) *Attorney, Agent, or Firm* — Fenwick & West LLP (57) ABSTRACT

An advertising selection and placement system is provided for a social networking system. An advertising selection module identifies candidate advertisements for a user to view along with social networking content. The candidate advertisements can be placed in various slots on the user's display. The expected value of various arrangements of the candidate advertisements in the slots is determined, and advertisements may be selected and placed to optimize revenue to the system. Each advertisement is evaluated using a discount function that adjusts the price of the advertisement based on its placement.

18 Claims, 3 Drawing Sheets

(56) References Cited

U.S. PATENT DOCUMENTS

| | | | |
|---|---|---|---|
| 2010/0198694 A1* | 8/2010 | Muthukrishnan | G06Q 30/02 705/14.71 |
| 2010/0299202 A1 | 11/2010 | Li et al. | |
| 2011/0029388 A1 | 2/2011 | Kendall et al. | |
| 2011/0047026 A1 | 2/2011 | Biggs et al. | |
| 2011/0153377 A1* | 6/2011 | Novikov | G06Q 10/063 705/7.11 |

FOREIGN PATENT DOCUMENTS

| | | |
|---|---|---|
| CN | 101479761 A | 7/2009 |
| KR | 10-2007-0097685 A | 10/2007 |
| KR | 10-2011-0116149 A | 10/2011 |
| KR | 10-2011-0137513 A | 12/2011 |
| TW | 201020954 A | 6/2010 |

OTHER PUBLICATIONS

Mind—A Brief Introduction, John R. Searle, 2004, Oxford University Press, pp. 62-67.*
What is Thought, Eric Baum, The MIT Press, 2004, pp. 33-65.*
Robotics, Science and Systems III, Wolfram Burgard, Oliver Brock, and Cyrill Stachniss, The MIT Press, 2008, pp. 41-48.*
European Patent Office, Search Report and Opinion, European Patent Application No. 13170217.7, dated Nov. 26, 2013, six pages.
PCT International Search Report and Written Opinion, PCT Application No. PCT/US2013/043922, dated Sep. 23, 2013, sixteen pages.
Canadian Intellectual Property Office, Office Action, Canadian Patent Application No. 2,873,133, dated Jan. 29, 2016, six pages.
Bateman, S. S., "Online Advertising Rates: Guidelines and Best Practices," Jan. 18, 2012, seven pages [Online] [Retrieved on Sep. 30, 2019] Retrieved from the Internet <URL: https://www.promisemedia.com/online-advertising/online-rate-card-tips-and-guidelines>.
Canadian Intellectual Property Office, Office Action, CA Patent Application No. 2,873,133, dated Nov. 25, 2016, eight pages.
Canadian Intellectual Property Office, Office Action, CA Patent Application No. 2,873,133, dated Oct. 23, 2017, ten pages.
China National Intellectual Property Administration, Notification of the First Office Action, CN Patent Application No. 2013800294047, dated Oct. 8, 2016, 31 pages.
IP Australia, Examination Report No. 2 for Standard Patent Application, AU Patent Application No. 2013271837, dated Mar. 23, 2018, seven pages.
IP Australia, Examination Report No. 3 for Standard Patent Application, AU Patent Application No. 2013271837, dated Jul. 16, 2018, six pages.
Jquery, ".position()," six pages, [Online] [Archived by http://archive.org on Nov. 23, 2011] [Retrieved on Sep. 30, 2019] Retrieved from the Internet Archive <URL: https://web.archive.org/web/20111123165322/http://api.jquery.com:80/position/>.
Korean Intellectual Property Office, Notice of Preliminary Rejection, KR Patent Application No. 10-2014-7035930, dated Mar. 30, 2017, 18 pages.
Mexican Institute of Industrial Property, Office Action, MX Patent Application No. MX/a/2014/014886, dated May 11, 2017, six pages (with concise explanation of relevance).
Taiwan Intellectual Property Office, Examination Statement, TW Patent Application No. 102119515, dated Jun. 27, 2016, 16 pages.

* cited by examiner

ADVERTISEMENT SELECTION AND PRICING USING DISCOUNTS BASED ON PLACEMENT

BACKGROUND

This invention relates generally to online advertising and in particular to selection, placement, and pricing of advertisements in a social networking system.

Advertising systems typically choose advertisements for users using a bidding process to select advertisements. Generally, the advertisement with the highest bid wins the advertising slot and the advertisement is served in the advertising slot. In some systems, there are several advertising slots to be filled together. The individual advertisements served in each slot may have a variable size or may otherwise affect the other advertisements filled together.

SUMMARY

A social networking system provides social networking content to a user along with advertisements. The advertisements on a page are bid on by advertisers, which provide ad requests that may include advertisements of varying sizes and associated bids. The advertisements selected for a page are placed on the page in one or more slots on the page, which are in different actual locations depending on the size of the selected advertisements. The placement of the winning advertisements is determined based at least in part on the bids for the advertisements, where the bids are discounted based on the placement of the advertisements on the page. In one embodiment, an expected value for the advertisements is computed using the discounted bids of the advertisements for various placements, and the expected values may be used to select the advertisements and their placement on the page.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
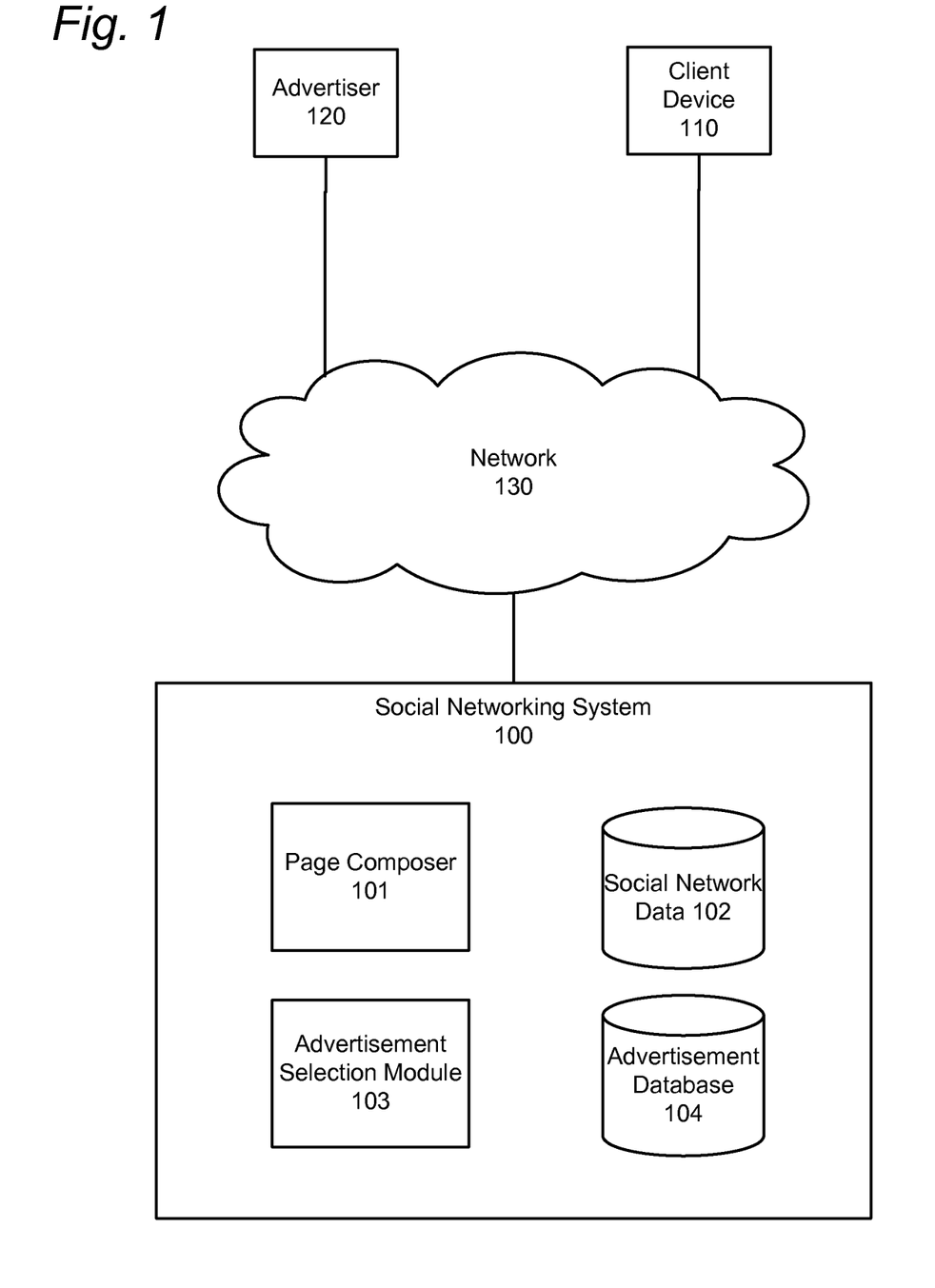
FIG. 1 is an overview of a social networking system using advertising selection and placement according to an embodiment.

FIG. 1 is an overview of a social networking system using advertising selection and placement according to an embodiment. A social networking system 100 provides social networking content and services to users of the social networking system 100. Users connect to the social networking system 100 using client devices 110 through a network 130. Users, through the client devices 110, connect with other users of the social network, share information and content, and manage relationships on the social networking system. As users browse content in the social networking system, the users are also presented with advertising information along with the social networking content. Advertisers 120 also connect to the social networking system 100 through the network 130 and provide information to the social networking system 100 about advertisements to display to users.

The social networking system 100 includes a page composer 101, social network data 102, an advertisement selection module 103, and an advertisement database 104 in an embodiment. The social networking system 100 receives requests from client devices 110 and provides social networking content and information in response. The page composer 101 is a module which receives and processes user requests and composes a display for the user. The page composer 101 accesses the social network data 102 in response to the user request to identify the requested social networking information for the client device 110. In addition to accessing the social networking data, the page composer 101 also determines a layout and display for the social networking content. The page composer 101 provides information to the client device 110 according to the capabilities of the client device 110. For example a client device 110 which accesses the social networking system 100 using an html interface is provided a page from the page composer 101 which is compatible with html. Other client devices 110 access the social networking system 100 using a specialized application, and the page composer 101 returns information using formatting for the specialized application to display.

In addition to social networking content, the page composer 101 also identifies advertising slots in the display provided to the client device 110. The advertising slots are provided to the advertisement selection module 103 along with information about the user. The advertisement selection module 103 identifies and selects advertisements to place with the social networking content. In addition to selecting advertisements, the advertisement selection module 103 determines the arrangement of the advertisements in the display. The advertisement selection module 103 accesses advertisement database 104 to identify advertisements for placement in advertising slots. The advertisement database 104 includes information about active advertising campaigns by advertisers. The advertising campaigns include advertising content for at least one advertisement, an advertising bid, and targeting criteria for the ads. Advertisers 120 communicate with the social networking system 100 to add and remove advertising campaigns to the advertisement database 104.

The advertising campaigns comprise any paid-for or sponsored content or information for presentation to the users of the social networking system 100. In addition, the advertising content varies in type and size of the advertisement. For example, some advertisements are a banner advertisement with a graphic for the advertiser, while other advertisements comprise textual information about an advertiser accompanied by relevant social networking content. The relevant social networking content may be static in the advertisement, or may be dynamic, allowing the social networking content to change depending on the individual the ad is served to or based on content posted by the advertiser. As such, the various advertising campaigns have various types of advertisements and have different sizes.

The client device 110 can be any computing platform for interacting with the social networking system 100. The client device 110 receives social networking and advertising content from the social networking system 100 and displays the information to the user of the client device 110. The client device 110 also receives input from the user and communicates the input to the social networking system 100. Suitable client devices 110 include desktop computers, tablet computers, mobile devices, and other devices capable of networked access to the social networking system 100 and displaying information to a user.

Variable Ad Display

Figure 2A:
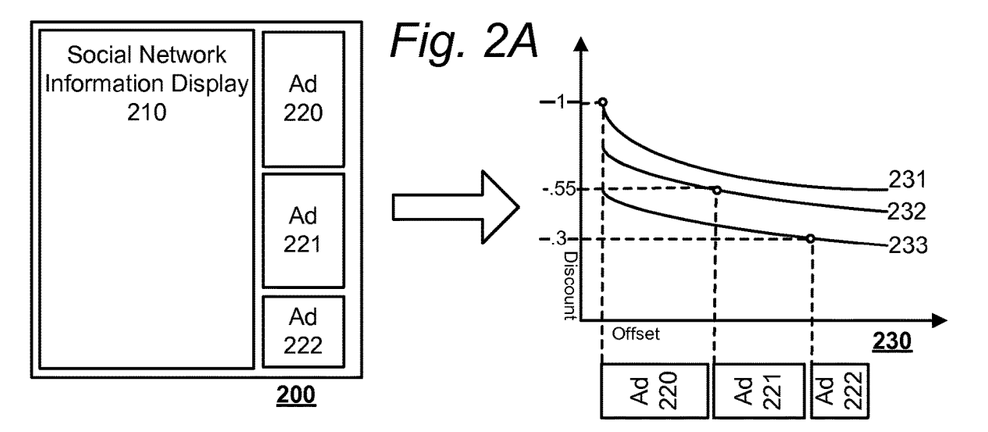
FIGS. 2A-2C illustrate discount curves for various placements of advertisements on a display screen, according to an embodiment.
Figure 2B:
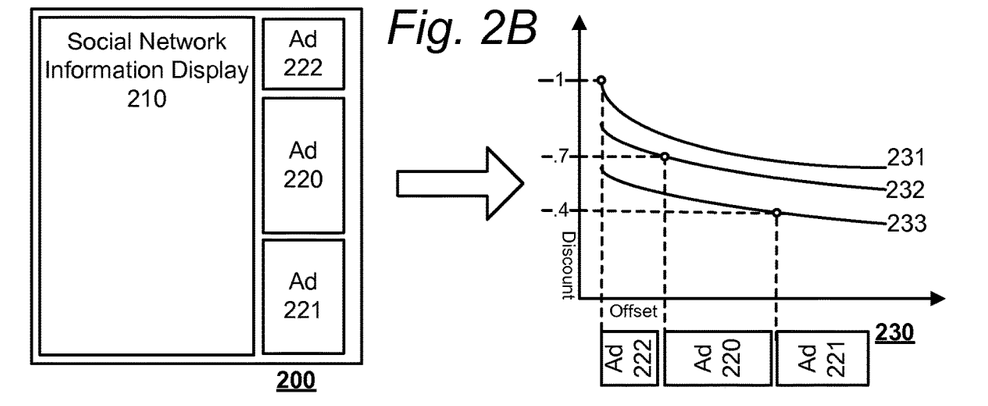
Figure 2C:
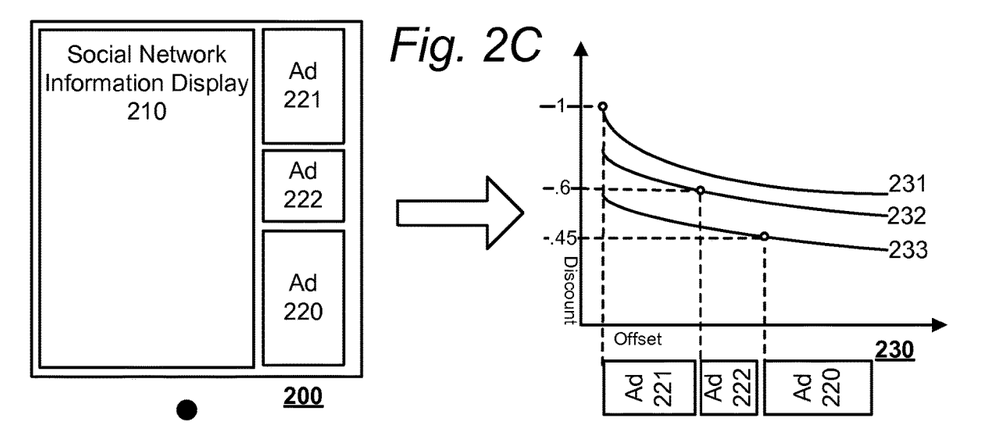

FIGS. 2A-2C illustrate discount curves for various placements of advertisements on a display screen, according to an embodiment. Social network display 200 is the display provided to the user of the client device. The social networking system 100 provides the composition of information in the social network display 200 and selection of content to be provided in the social network display 200. The social network display 200 includes social network information display 210 and several advertisements 220, 221, and 222. The social network information display 210 provides social networking content in a portion of the social network display 200, while the advertisements occupy another portion of the display. In an embodiment, the advertisements and social network content are intermixed in various portions of the social network display 200. For example, the social network display 200 may include several types of feeds in different portions of the page. Each feed may include advertising information in the feed along with social networking content.

The advertisements selected for placement on the page are selected from active advertising campaigns in the advertisement database 104. The advertisement selection module 103 includes a bidding algorithm to select the individual advertisements to include on social network display 200. The bidding algorithm can use a generalized second price auction, a Vickrey-Clarke-Groves (VCG) auction, or other auction methodology for selling several like-kind items. For simplicity in this disclosure, the selection of advertisements is selected using a cost per impression or CPM model of advertiser bidding. That is, the advertiser bids an amount relative to the value of the advertiser of an impression of the user. Other advertising models may be used, for example using a cost-per-click (CPC) model or other method of pricing bids. A CPC model may be adjusted by a click through rate for the advertising campaign to determine an expected cost per impression (eCPM) for the advertisement. The advertising selection and bidding process first determines the number of slots available for advertisements, and next executes the auction to determine the winning advertisements.

The advertisements 220, 221, and 222 are advertisements provided in the social networking display 200 to the user. The advertisements 220, 221, and 222 are a variety of different sizes, as shown. Advertisement 220 is the largest advertisement, advertisement 221 is a mid-sized advertisement, and advertisement 222 is the smallest advertisement of these three. Each advertisement is shown to the user on the social network display 200. The placement of the advertisements within the social network display 200 affects the likelihood a user will interact with an advertisement. Typically, the advertisements near the top of the page receive the highest interaction, and there is reduced interaction by the user the further down the page the advertisement is located. In this example, there are three slots in the display for advertisements. FIGS. 2A-2C illustrate different placements of the three advertisements 220-22 in the three advertising slots.

Comparing the advertisement placements in FIGS. 2A-2C, varying arrangements of the advertisements 220-222 are shown. Since user interaction varies according to the location an ad is placed on the display, the selection of an advertisement for a slot affects the amount of user interaction for subsequent slots. For example, a smaller advertisement has a smaller effect than a larger advertisement, because the smaller advertisement allows the subsequent ad to be placed higher on the page. A larger ad forces subsequent ads further down the page. This difference is shown by comparing FIG. 2A with FIG. 2B. In FIG. 2A, the larger ad (advertisement 220) is placed in the first slot, causing the subsequent ad (advertisement 221) to be placed further down the page. In FIG. 2B, a smaller ad (222) is placed in the first slot, causing the subsequent ad (220) in the second slot to start higher up the page relative to FIG. 2A. That is, the offset of each subsequent advertisement from the top of the page is affected by the prior placement of ads in the display.

Discount Curves

The effect of placement of an ad on its interaction rate with users is modeled using discount curves 230. A discount curve represents the reduced interaction rate of users and a discount value for each advertising slot as a function of the offset of the ad from the top of the ad space. FIGS. 2A-2C illustrate discount curves for three advertising slots in three different ad placement configurations. In these examples, each advertising slot has its own discount curve. The first slot is represented by discount curve 231, the second slot by discount curve 232, and the third slot by discount curve 233. As shown, the discount curve generally decreases as the offset from the top of the page increases. Though the advertisers bid on the slots in this embodiment as though the slots were equally valuable, each slot's value varies according to the interaction rate of the users. A discount is provided to the actual price an advertiser pays based on the placement of the advertisement in the slots. Each discount curve provides the discount for each advertisement given its placement on the page.

The offset for an advertisement is determined using the cumulative heights of the ads before it. The height of an ad may be static and stored by the social networking system 100 with other information about the advertisement, or the height for an advertisement may be dynamic. The height of an advertisement can be determined by the social networking system 100 by calculating the components of the advertisement and determining the height of the portions. For example an advertisement may include a social recommendation, a statement about a product, and a banner. For some users provided the ad, there may be no social recommendation. The advertising height therefore may be determined on a user-by-user basis as the height of the advertisement changes. In other embodiments, the system provides the advertisement to a user device, and the user device renders the advertisement and returns the offset or height of the advertisements to the social networking system 100. The returned information can be stored with the ad to indicate the height of the advertisement.

The discount curves are calculated over time using user responses to advertising placement. As the social networking system 100 places advertisements on a page of content for display to users, it can maintain a record of the positive responses provided by users and correlate the user responses to the slot and offset of the ad the user responded to. Using responses from many users, the social networking system 100 can construct discount curves using actual response data reflecting the user likelihood of interacting with an advertisement. In one embodiment, the same discount curves are used across advertisements and users. In other embodiments, the discount curves are adjusted or selected individually for the advertisement or the user. For example, if an advertisement is served a sufficient number of times, a specialized discount curve may be calculated using that individual advertisement. Though the discount curves are generally expected to decrease as offset increases, since the discount curve is constructed using user responses, the discount curve will reflect actual user response rates, which may increase at a particular offset.

Using the discount curves, the system can determine the expected value (EV) of particular arrangements of advertisements on the page. The EV for an individual advertiser is the advertiser's price result from the auction P, multiplied by the discount value D for a particular placement. Using the discount curves, the discount value D is a function of the slot and the offset: D(slot, offset). The EV for the page is the sum of each advertisement's EV for a given ad placement. As the expected value of the page changes according to the ad placement, the system identifies an ad placement order to increase the EV of the page.

FIGS. 2A-2C illustrate discounts using three different ad placements for the three advertisements 220, 221, and 222. Using the discount factors for the various placements in conjunction with the pricing result of the auction, the system can determine which advertising placement to choose. As an example, suppose the results of the auction provided Ad 220 would pay $1.00, Ad 221 would pay $0.90, and Ad 222 would pay $0.80. The actual benefit expected by the advertisers is modified by the placement of the advertisements on the display. As such, the expected value is modified by the associated discount on the discount curve. Table 1 illustrates the value of each advertisement using the placements provided in FIGS. 2A, 2B, and 2C.

TABLE 1

|  | FIG. 2A | FIG. 2B | FIG. 2C |
| --- | --- | --- | --- |
| Ad 220 $1.00 | $1.00 (1.0) | $0.70 (0.7) | $0.45 (.45) |
| Ad 221 $0.90 | $0.50 (0.55) | $0.36 (0.4) | $0.90 (1.0) |
| Ad 222 $0.80 | $0.24 (0.3) | $0.80 (1.0) | $0.48 (0.6) |
| Total Page EV | $1.74 | $1.86 | $1.83 |

As shown by Table 1, the expected value of each arrangement of advertisements differs based on the discount value applied to the ads. As shown by Table 1, the highest expected value is the placement of FIG. 2B, which places the smallest advertisement 222 in the first slot despite that it had the lowest bid. In this example, arranging the advertisements sequentially by either size or price as shown in FIG. 2A provided the lowest expected value. In addition to the arrangements shown in FIGS. 2A-2C, further arrangements can be evaluated by the system to examine the remaining permutations.

In evaluating the placement of advertisements, the system may sequentially view each permutation, or may use optimizations to reduce the number of permutations needed. One optimization is to identify placements that are always suboptimal to other placements. For example, provided discount curves which decrease as a function of offset, larger ads with an equal or lower value are suboptimal to smaller ads for a higher slot. A first ad with a large size and a price of $10 will never be placed ahead of a second ad with a medium size and a price of $10. This is because for the same or lower price, the medium size ad does not impact the subsequent ad as much as the larger ad.

Another method for implementing an optimization uses a branch-and-bound technique to optimize advertising selection. This technique branches candidate placements for the first slot and determines bounds on the expected value for each branch. A maximum value bound is determined to identify the highest expected value of each branch. To determine maximum value bounds for each branch, simplifying assumptions are made for each branch. An example simplifying assumption determines or specifies the value of placements in slots subsequent to the first slot. Such simplifying assumptions may include assigning each slot subsequent to the first slot the highest discount value for the slot. The branch with the highest maximum value bound is selected, and an actual placement for that branch is determined based on possible advertising placements. The value for the actual placement is determined and used to eliminate branches having a maximum bound lower than the value for the actual placement. After eliminating branches, the remaining branches are expanded by creating additional branches for the next most-valuable slot. The maximum value for these branches is determined and the process proceeds to eliminate additional branches. This process continues recursively for each slot for the remaining branches until no further recursion is possible and the highest expected value is selected.

In one embodiment, the number of advertising slots is dynamically selected depending on the placement results. That is, a page accommodates a specific viewing area for containing advertising. The viewing area may be able to accommodate at most 2 "large" ads, 3 "medium" ads, and 4 "small" ads. The advertising selection process identifies the advertisements which would be selected under each circumstance, and identify the EV of the best arrangement of each method. The system can select the number and size of ad which best maximizes the expected value of the viewing area.

Advertising Placement Selection

Figure 3:
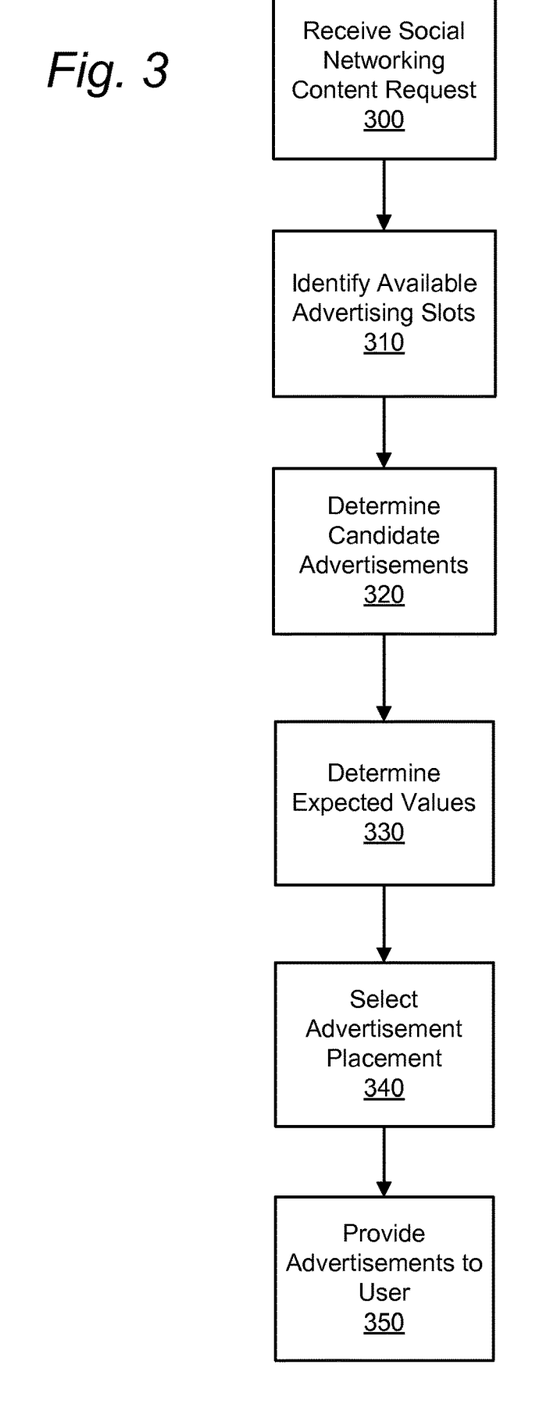
FIG. 3 is a flow chart of a method of selecting ad placements according to an embodiment.

FIG. 3 is a flow chart of a method for selecting ad placements according to an embodiment. First, the system receives 300 a request for social networking content from a user. Next, the system identifies 310 available advertising slots to accompany the social networking content. The slots are spaces in which the social networking system may serve advertisements. Based on information about the user and the available advertisements, the system determines 320 a set of candidate advertisements that can be served to the user The system then determines 330 an expected value for serving selected ones of the candidate advertisements in various placements, where each placement includes one of the candidate advertisements in each slot. The expected value of a particular placement may be computed as the sum of the contributions for each selected ad in the placement. The contribution of each ad may be computed based on the bid value of the ad discounted by a factor based on a displacement of the ad and/or the slot in which the ad is placed, as illustrated in FIGS. 2A-2C. For CPC pricing models, the expected value may also be based on an expected click-through rate (eCTR). The system may then select 340 a placement of ads (which includes which candidate ads to include in which slots) based on the determined expected values, such as by selecting the placement with the highest expected value.

Once the placement order is determined, the advertisements are provided 350 to the user along with the social networking content.

Content Types

Though the discount curves above are described relating to the offset of an advertisement from the top of the page, discount curves may take into account other features of advertisements which affect other advertisements in the same advertising space. For example, the content type of an advertisement may affect other advertisements in the advertising space and may be reflected by a discount. Such content types could include advertisements that include photos, audio, video, textual advertisements, and other aspects of an advertising campaign. Placing a video campaign above a textual campaign, for example, may tend to obscure the textual campaign significantly more than the textual campaign obscures the video campaign.

Advertisements may impact other advertisements in other ways. In one embodiment, advertisements are associated with a continuation probability. The continuation probability indicates the likelihood that a user continues to view additional advertisements on the webpage. For example, if the advertisements are arranged in a row or a line across the page, the user may scan the advertisements sequentially. The continuation probability indicates the likelihood the user halts viewing advertisements or whether the user continues to view subsequent advertisements. The discount of subsequent advertisements is increased for advertisements placed after an advertisement likely to cause a user to halt viewing advertisements. However, there may be no discount if an advertisement with a high likelihood of halting advertisement viewing is placed last because there are no additional advertisements to view. The continuation probability of an advertisement may be determined by the frequency that users interact with subsequent advertisements. Alternatively, the continuation probability of an advertisement may be input by an operator of the system. The operator may view the advertisement and determine whether the advertisement is likely to cause a user to halt advertisement viewing. For example, the operator may determine the likelihood of a halt based on objectionable content in the advertisement. In one embodiment, the social networking system 100 automatically determines whether the advertisement contains objectionable content.

Advertisement Locations

Though described above as impacting an advertising space of offsets within a particular portion of the page, the various discount curves may also be incorporated into deciding different portions of a page to place advertisements. For example the system may have advertising slots on a banner, within main content of the page, or on a sidebar and need to balance the effects on the advertisers of the various placements. In addition, whether to place a particular advertisement within content can be weighed against the effects on the user of advertising. Such advertising may affect user engagement, and the user engagement with content can be viewed as a distinct expected value to be improved by the system.

Online Content System

Though described above with respect to a social networking system, embodiments of this disclosure include any content system which places advertisements in various locations of a user's display. The social networking system may provide ads with different heights because of social content included in the advertisements. Other content systems include variable height (or other dimension) advertisements which impact other advertisements also displayed on the page. These systems may also use advertising placement techniques as described herein.

Mixed Content Type Systems

In one embodiment, the selection and bidding process incorporates mixed content types. Such content types can include advertisements and relevant social content for presentation to the user. For example, an advertisement may be chosen for placement in a feed including information relevant to the user, such as activity by the user's connections. Individual pieces of content are selected for placement in the feed, which may include advertisements and social networking content. The social networking system 100 may determine a monetary value to the social networking system for providing each piece of content. For the advertisements, an expected value of an advertisement to the social networking system 100 is determined. For example, an expected value for an advertisement is determined by multiplying a bid amount associated with the advertisement (as provided by an advertiser) by a probability that a user will access the advertisement. As another example, the bid amount of the advertisement is its expected value. For other types of content, a monetary equivalent may be assigned to the piece of content according to the content's relevance to the user, promotion of goals relevant to the social networking system, the type of content, and other factors. In this embodiment, the selection of content items is selected by maximizing the monetary value of the content items.

As described above regarding advertisement-only selection, content items are selected by optimizing the monetary value of the selected content items. The monetary value of content items is also impacted by the placement of each content item as described above with respect to advertisements. Accordingly, content item selection may also follow content selection rules determined by an operator of the social networking system 100. For example, for a mobile device, display space may be limited for the user. The content selection rules may therefore determine that the first two pieces of content are related to social networking content (e.g., a friend's new photos or a status update) and that at most one advertisement may be included on the page. Using these rules, the content selection process identifies particular pieces of content for inclusion in the feed to maximize the return to the social networking system. Thus, accounting for the value of providing social networking content as well as advertisements allows the social networking system 100 to obtain maximum value from providing various types of content.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a plurality of advertising requests, the advertising requests including a bid and advertising content;
   identifying an opportunity to provide an advertisement impression to a viewing user of an online system on a client device of the viewing user;
   for the viewing user, identifying a display containing an ad space, wherein the ad space is an area of the display having a reference edge and containing a plurality of advertising slots arranged along a dimension in the display, the dimension being perpendicular to the reference edge;
   selecting a plurality of candidate advertisements eligible for display to the viewing user;
   determining a plurality of candidate placement configurations, each placement configuration assigning a candidate advertisement to each of the plurality of advertising slots in the display;
   computing a score for each of the candidate placement configurations by:
      determining, for each candidate advertisement, a value of the candidate advertisement based on the bid for the candidate advertisement,
      sending, to the user device, each candidate advertisement,
      receiving, from the user device, rendered sizes, in the dimension, for each candidate advertisement,
      determining, for each candidate advertisement, an offset of the candidate advertisement in the dimension from the reference edge based on the candidate placement configuration, wherein the offset is a function of the rendered sizes of candidate advertisements assigned to advertising slots located between the reference edge and the assigned slot of the candidate advertisement,
      discounting the determined value of each candidate advertisement based on the determined offset of the candidate advertisement, wherein an increase in the size of the determined offset of the candidate advertisement results in an increased discounting of the candidate advertisement, and
      aggregating the discounted values of the plurality of candidate advertisements to obtain the score for the candidate placement configuration;
   selecting a candidate placement configuration from the plurality of placement configurations based on the computed scores; and
   sending, to the client device, the display for viewing by the viewing user, the display comprising a set of candidate advertisements assigned to the slots according to the selected placement configuration.

2. The method of claim 1, wherein the actual location of the set of candidate advertisements comprising the display is determined after the display is sent to the client device for display.

3. The method of claim 1, wherein the rendered sizes of the candidate advertisements are based on the identity of the viewing user.

4. The method of claim 1, wherein discounting the determined value of each candidate advertisement is based on a discount function, the discount function providing a discount based on the actual location of each candidate advertisement and estimated user interaction rates with the actual location.

5. The method of claim 1, further comprising:
   determining an amount to charge an advertiser of a selected advertisement based in part on the bid of another selected advertisement.

6. The method of claim 4, wherein the discount function is based at least in part on an estimated click through rate for ad placements.

7. The method of claim 1, wherein the selection of candidate advertisements and the selection of a candidate placement configuration are based in part on an expected value of the placement of the selected advertisements relative to an alternative placement.

8. The method of claim 1, wherein discounting the determined value of each candidate advertisement is based in part on which of the advertising slots each candidate advertisement is assigned.

9. The method of claim 1 further comprising:
   rendering each of the plurality of candidate placement configurations; and
   determining, for each candidate advertisement, based on the rendering of each placement configuration, an offset of the candidate advertisement in the dimension from a reference position based on the candidate placement configuration and the size, in the dimension, of the other candidate advertisements.

10. The method of claim 9 further comprising rendering each of the plurality of candidate placement configurations based on a profile on the online system of the viewing user.

11. A method comprising:
receiving a plurality of advertising requests, each advertising request including a bid;
identifying an opportunity to provide an advertisement impression to a viewing user of an online system on a client device of the viewing user;
for the viewing user, identifying a display containing an ad space, wherein the ad space is an area of the display having a reference edge and containing a plurality of advertising slots arranged along a dimension in the display, the dimension being perpendicular to the reference edge;
determining a plurality of candidate advertisements for the user based on the plurality of advertising requests;
for each of a plurality of candidate placements, where a placement comprises a selection of a candidate advertisement from the determined advertisements for each advertising slot, computing a value for the candidate placement that is based on the bids of the advertisements in each slot and a relative displacement from the reference edge along the dimension of a candidate advertisement in a slot due to an advertisement in another slot, wherein the relative displacement of the candidate advertisements in each is determined by:
sending, to the user device, each candidate advertisement,
receiving, from the user device, a rendered relative displacement from the reference edge, in the dimension, for each candidate advertisement
selecting a placement from the candidate placements based on the computed values therefore; and
sending the display having the selected placement to the client device of the user.

12. The method of claim 11, wherein each of the plurality of advertising requests further includes targeting criteria, and the selection of candidate advertisements is based at least in part on the targeting criteria and a profile associated with the user.

13. The method of claim 11, wherein each of the plurality of the advertising requests includes advertising content associated with a size, and the relative displacement of the other selected advertisements is based on the size of the advertising content in the selection of advertisements.

14. The method of claim 13, wherein the size of advertising content associated with at least one advertising request in the selection of advertisements varies based on the identity of the user.

15. The method of claim 14, wherein the size of advertising content is determined in part on content added to the advertising content.

16. The method of claim 15, wherein the content added to the advertising content is social networking content.

17. The method of claim 13, wherein the size of the advertising content is determined based on information received from a client after the advertising content has been provided to a user.

18. A method comprising:
receiving a plurality of advertising requests, each advertising request associated with a bid and advertising content;
a step for optimizing revenue from a placement configuration of a portion of the advertising content associated with the plurality of advertising requests into a plurality of slots arranged along a dimension perpendicular to a reference edge in an online page of content, the price of an advertising request based on its bid and an offset in the dimension from a reference edge, wherein the offset is determined by:
sending, to the user device, each candidate advertisement,
receiving, from the user device, a rendered offset from the reference edge, in the dimension, for each candidate advertisement
selecting a placement configuration the advertisement content based on the step for optimizing; and
sending the advertising content in the selected placement configuration to a user device.

* * * * *